United States Patent [19]

Simmons

[11] Patent Number: 5,178,578
[45] Date of Patent: Jan. 12, 1993

[54] POULTRY CROP REMOVER

[76] Inventor: Lacy Simmons, 101 Simmons Industrial Blvd., Dallas, Ga. 30132

[21] Appl. No.: 886,888

[22] Filed: May 22, 1992

[51] Int. Cl.[5] .................................................. A22C 11/00
[52] U.S. Cl. .................................... 452/117; 452/116
[58] Field of Search ...................... 452/117, 118, 116

[56] References Cited

U.S. PATENT DOCUMENTS

| 4,610,050 | 9/1986 | Tieleman et al. | 452/117 |
| 4,910,829 | 3/1990 | Simmons | 452/116 |
| 4,958,408 | 9/1990 | Meyn | 452/117 |
| 5,122,090 | 6/1992 | Vende Nieuwelaar et al. | 452/116 |

Primary Examiner—Willis Little
Attorney, Agent, or Firm—Eric P. Schellin

[57] ABSTRACT

A probe for removing the crop and other viscera in poultry. The probe is cylindrical and is rounded at its distal end. Intermediate its ends is a grasping comb section consisting of a plurality of axially disposed channels. The channels each have walls that terminate in a plurality of spaced generally arcuate teeth the surfaces of which are essentially flush with the cylindrical probe. The probe is mounted on a module that in turn is mounted to traverse synchronously with poultry carrying shackles on an endless line. The probe and mechanisms therefor is detailed to enter into the neck portion of the chicken, rotate therein to thereby grasp with the teeth the crop and to withdraw the crop through the same opening that the probe entered.

12 Claims, 6 Drawing Sheets

POULTRY CROP REMOVER

BACKGROUND OF THE INVENTION

The invention is directed to a poultry processing apparatus and more specifically to an improved cropper remover. In the apparatus a vertically disposed probe enters the poultry through a vent opening which has been previously cut thereinto. The probe is connected to rotating means. It has special configuration whereby to thereby grasp the crop. The apparatus is detailed to withdraw the probe and therewith the crop from the poultry through the said vent opening. The poultry is then released for further processing.

DESCRIPTION OF THE PRIOR ART

The present inventor has disclosed and patented a number of inventions to poultry crop removers. Exemplified thereby is U.S. Pat. No: 4,910,829. This patent is incorporated herein in its entirety by reference.

Furthermore, Tieleman in U.S. Pat. No: 4,610,050 discloses a probe for entering the torso of poultry through a previously cut vent. The probe of Tieleman is supplied with sharp edges that have a tendency to lacerate the contents of the poultry thereby spilling the contents of the crop and other viscera into the abdominal cavity thereby infecting the inside of the poultry with bacteria.

SUMMARY OF THE INVENTION

The invention is to a system for processing poultry such as chickens, turkeys and various other birds that are or may be employed for human consumption. It also includes a module for accomplishing the intended purpose, said module may be replaced in a system as required. The system, then, includes a plurality of the said modules which are mounted in an endless fashion adjacent a conventional poultry processing line employing shackles on a horizontally disposed endless chain wherein the shackles are employed to carry defeathered partially processed chickens for example.

The module is detailed to perform a plurality of operations during its course of travel the first part of which is in sequence with the travel of the poultry. The module performs the various operations due to appropriately positioned cam surfaces which together with rollers and power take off means drive each of the modules in turn through its designated paces.

As the poultry approaches the station of the system each of the poultry in turn is grasped and thrust towards an individual module. The bird is in an upside position with its back side against the module. It is lifted upwardly under the leg portion between the legs and the carcass in a direction towards a loop ring and is held, for instance by a neck breaker, if present or other means. The probe of the present invention is thrust into the bird through a previously cut upwardly facing vent and extends into the neck. The probe has a series of aligned hooks. The probe is rotated clockwise to essentially curl around the probe the crop and other neck viscera of the bird. The hooks and other structure of the probe have been detailed to be particularly effective in enmeshing the crop.

At the same time the module may carry a neck breaking assembly which may be of the type disclosed in the aforementioned U.S. Pat. No. 4,910,829 or it may constructed in another fashion. The neck breaking details are here included to merely illustrate that the module may due double duty as lower cam surfaces and equipment responsive thereto may break the neck of the poultry while upper cam surfaces operate the descent of the probe, the rotation thereof, the assent of the probe and finally the discharge of the crop from the probe during cleaning thereof.

Furthermore, when the entwining of the crop onto the probe has been completed, while the module and birds have been successively traversing the processing station, the probe is withdrawn from the bird through the vent carrying the crop on and about the probe.

As the modules reach the end of their traverse they move away from the poultry processing line freeing up the individual birds in sequence. The modules are moved to the backside of the station where the crop is removed from the probe by rotating the probe in a counterclockwise direction to thereby centrifugally unfurl and discharge the crop. The probe is also given a cleaning with a strong water spray while it is being rotated counterclockwise.

The modules are then brought around again to face the poultry processing line for repeated utilization in an endless fashion.

DETAILED DESCRIPTION

It should be noted at the outset, that the neck breaker and crop removal assembly of the present invention is adapted to be mounted on a support module that is mounted together with other support modules on a conveyer line adjacent to the path of a poultry processing line. The structure of the conveyer and its drive assembly are well illustrated and disclosed in aforementioned U.S. Pat. No. 4,910,829; and especially the module for neck breaking and the predecessor crop removal assembly. As such they will only be briefly discussed as it relates to the improved crop remover to which the present invention is directed.

Figure 1:
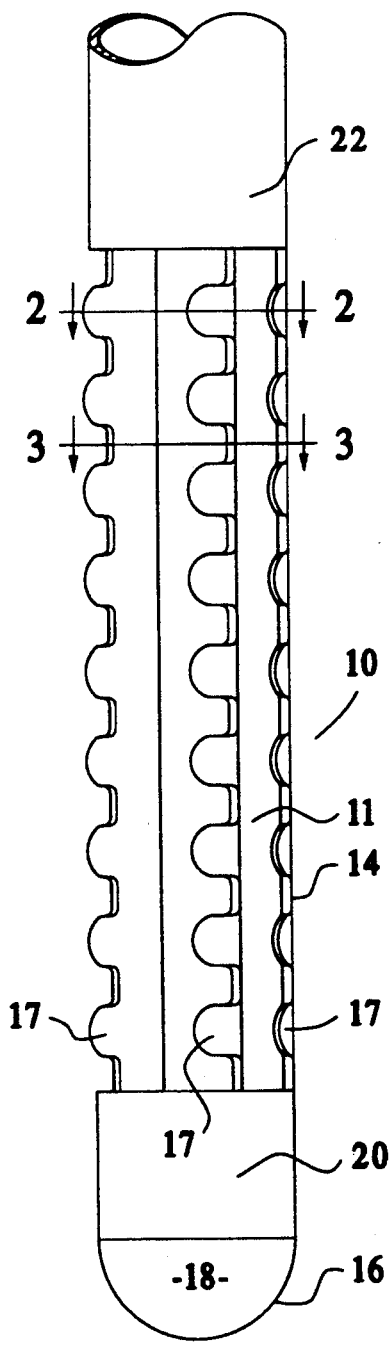
FIG. 1 is a partial side view of the probe of the present invention.
Figure 2:
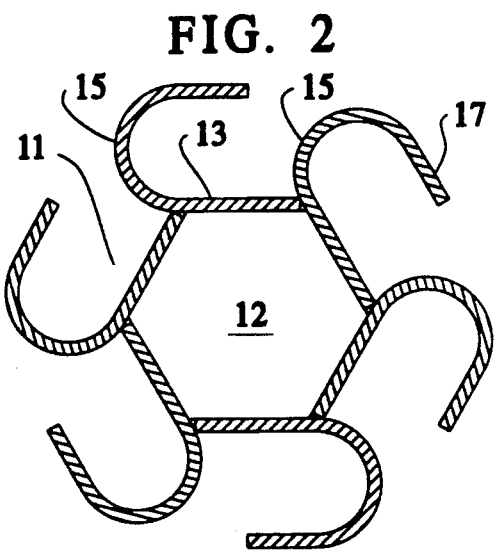
FIG. 2 is a cross-sectional view of the probe taken along line 2—2 of FIG. 1.
Figure 3:
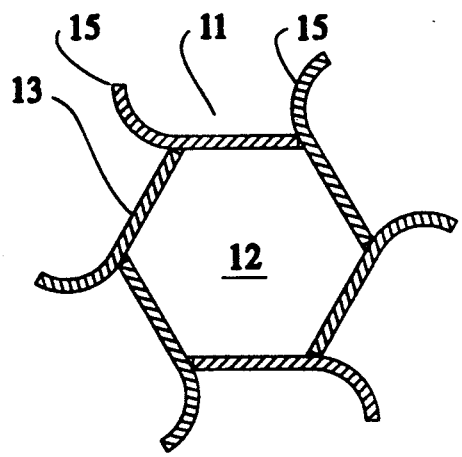
FIG. 3 is a cross-sectional view of the probe taken along line 3—3 of FIG. 1.

The probe, shown generally by reference numeral 10 in FIG. 1 has a cylindrical configuration. It may be solid or hollow as shown in the cross-sectional views of FIGS. 2 and 3 by a space 12. While dimensions are not critical it is important to note that the size should be adequate to do the task and that larger poultry, such as turkeys will require larger probes than a probe designed for a chicken poultry line. As a chicken poultry line runs chickens of about 2-8 lbs the probe in such a circumstance will be about 9 inches in length and about one and one-eighth inch in diameter. Such a probe has a comb portion 14 of about five inches which is about 1.5 inches from the end 16.

The rounded tip 18 is preferably constructed of a plastic. Cylindrical section 20 is stainless steel metal. The comb portion 14 is also preferably constructed of stainless steel and will be given further elucidation below. After the comb portion 14 as the proximal portion is another cylindrical portion 22 which terminates in a holder 24 shown in FIG. 6.

The comb portion 14 comprises six elongated axial disposed channels 11. The channels 11 are defined by elongated bottoms 13 and by radially extending arcuate side walls 15. The arcuate side walls 15 terminate with six rows of nine separately spaced tabs 17. The outwardly facing surfaces of the tabs 17 are essentially arcs of an imaginary circle which has the same diameter as the diameter of the cylindrical section 20 and cylindrical portion 22 whereby the cylindrical section, cylindrical portion and the comb surfaces are all essentially flush with one another.

Figure 4:
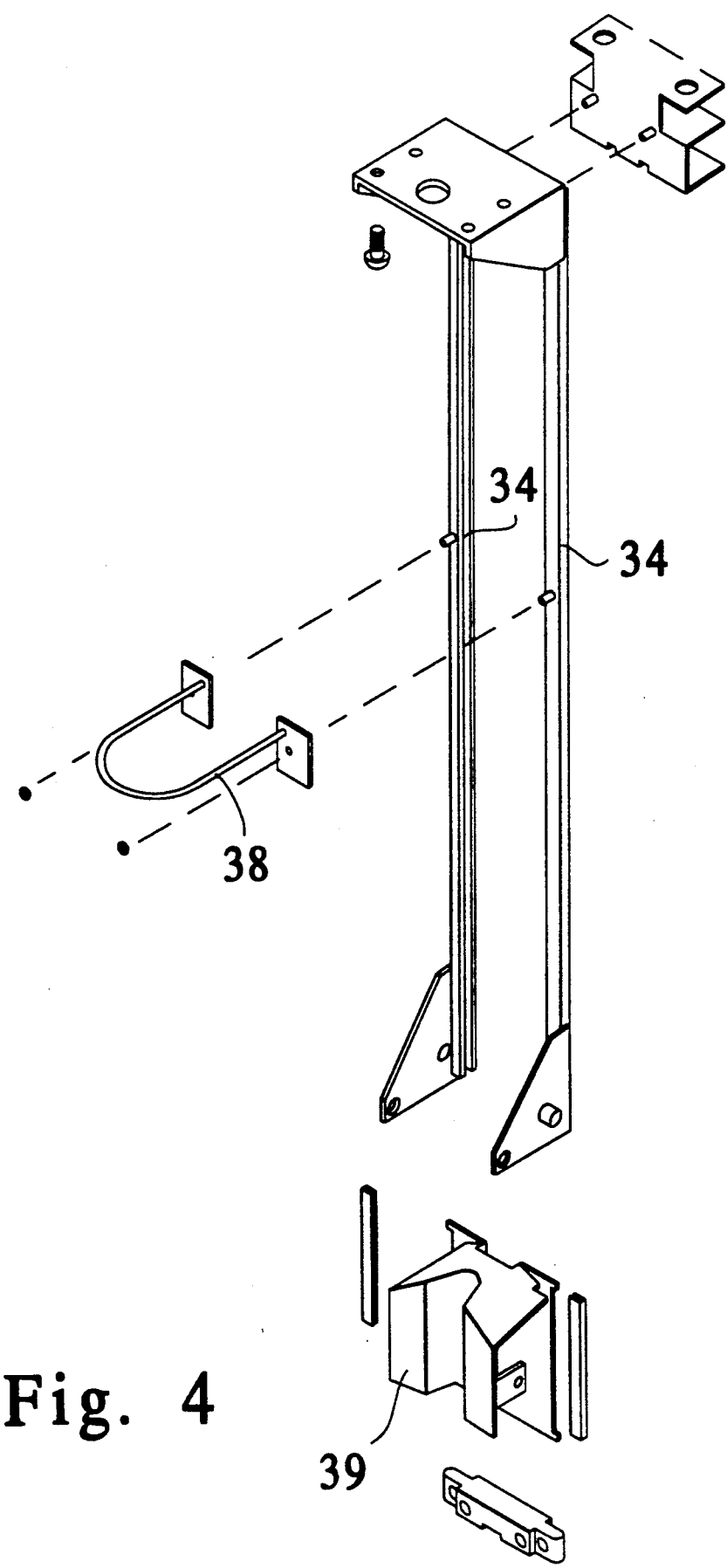
FIG. 4 is an exploded partial perspective view of themodule for carrying the probe of the present invention and neck breaker.
Figure 5:
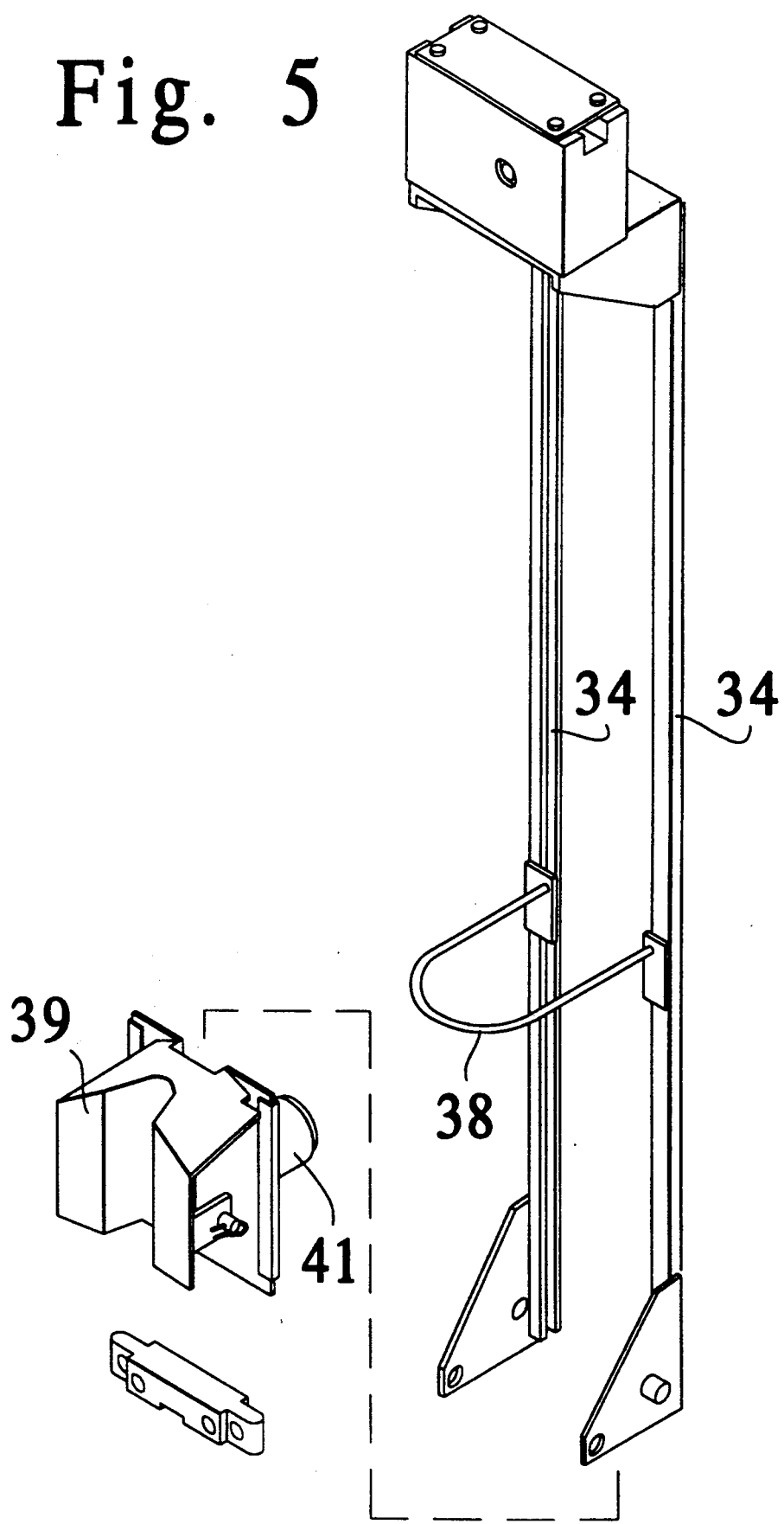
FIG. 5 is an exploded partial perspective view of the module for carrying the probe of the present invention and neck breaker showing some other details.
Figure 6:
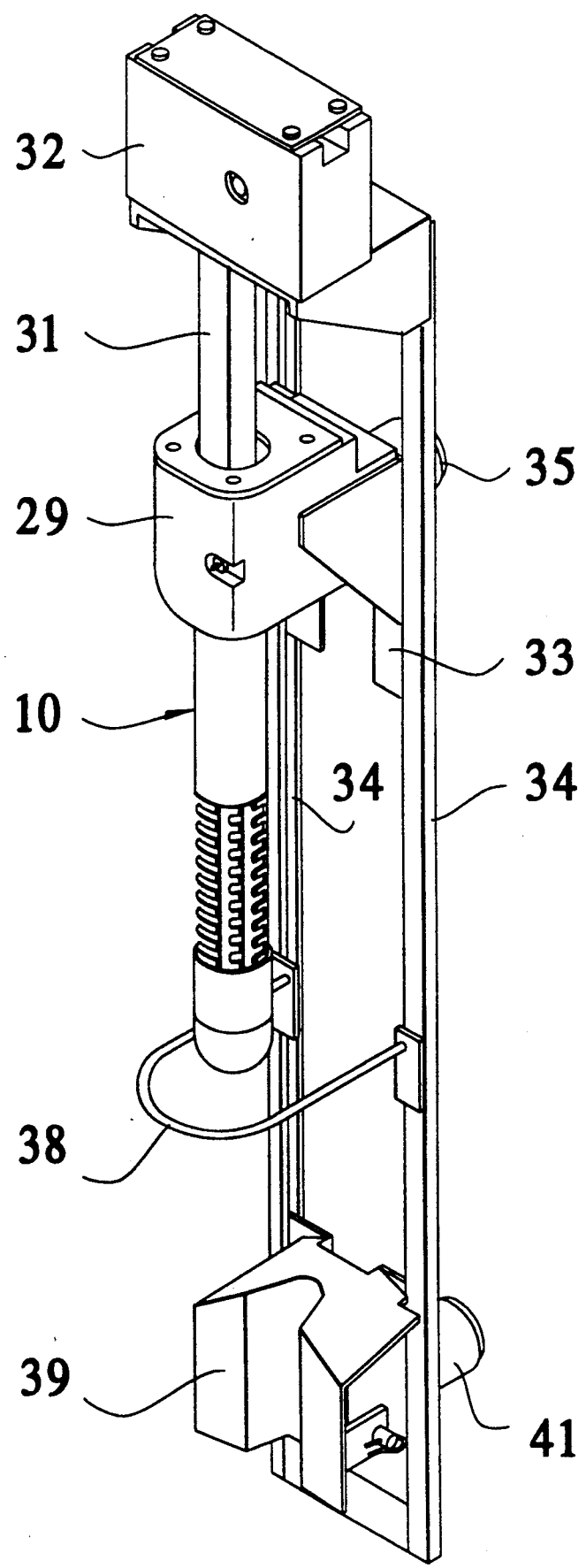
FIG. 6 is a perspective of the module with the probe of the present invention in place.
Figure 7:
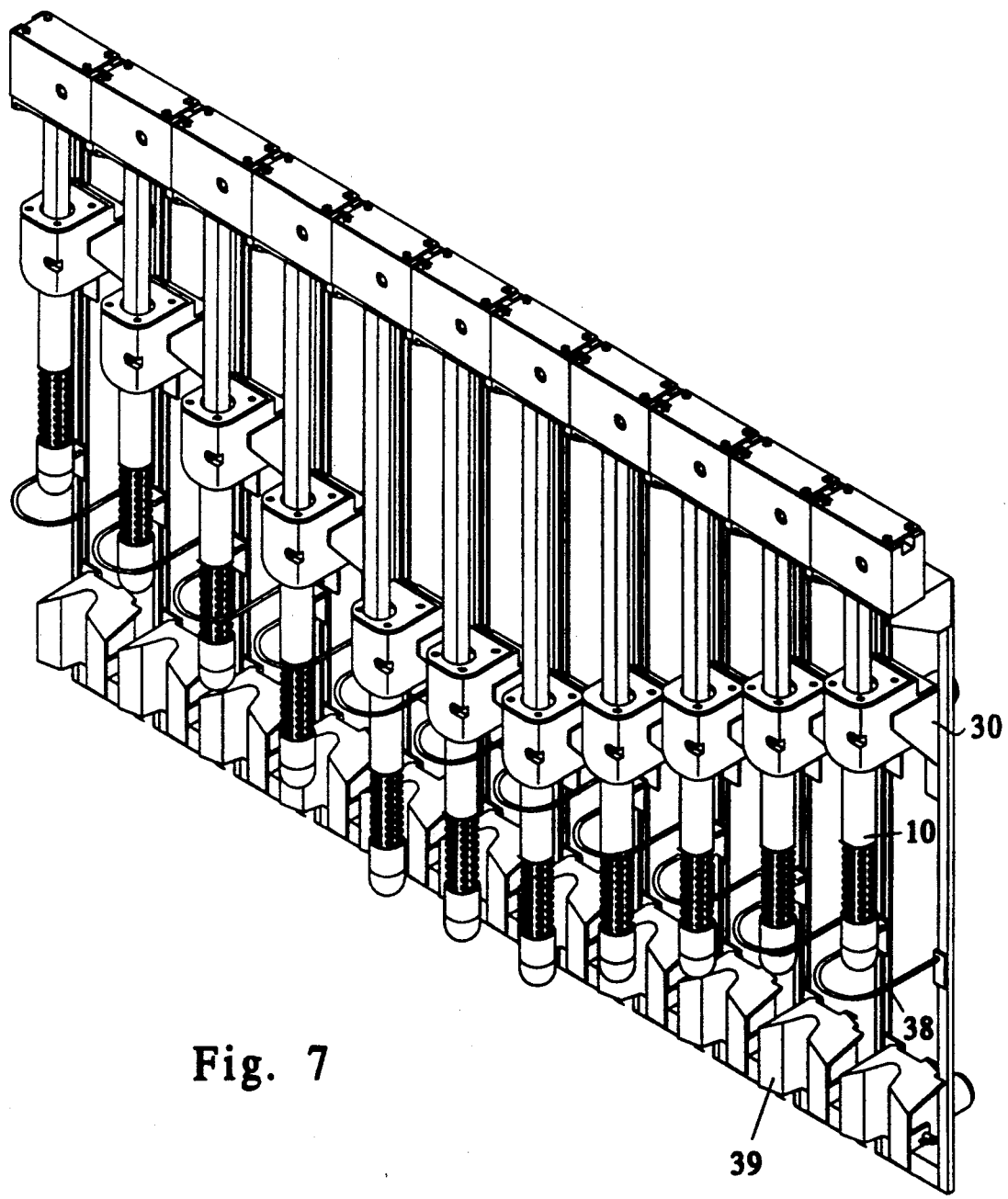
FIG. 7 is a perspective view of the present invention showing a series of modules along a working line.

The probe 10 of the present invention is used in place of the probe disclosed in mentioned U.S. Pat. No. 4,910,829 i.e., it is mounted in each module 30 shown in FIG. 7 herein. FIGS. 4, 5, and 6 show various parts of such a module 30. Note therefrom that in FIG. 6, the probe 10 at its proximal end is vertically mounted in a holder 24, a drive shaft 31 extends upwardly therefrom into a gearing means 32. The gearing means 32 is suitably journalled to a drive means (not shown) whereby the probe is driven in a clockwise direction when traversing the front of the endless carrier means when the probe is in the upside down poultry and is driven in a counter clockwise direction when on the backside traverse of the carrier means.

In other words a series of modules 30 are mounted on an endless carrier means and move at a speed commenserate with the speed of the shackles on an endless chain, each shackle carrying a single bird which has undergone previous selected treatments. It is pressed against a corresponding module with its spine facing the module 30. A vent has been previously cut into the top facing body portion into which the probe 10 enters with downward movement in the direction and into the neck and is rotated in the bird. The traverse is from left to right in FIG. 7 absent a bird. The probe 10 is rotated clockwise. The probe is constructed in the aforementioned ingenious fashion whereby the crop located in the neck of the bird is grasped by the tabs 17 of the comb portion 11 of the probe 10. The further rotation of the probe curls the crop therearound in a sufficiently tight manner whereby it is pulled out of the said previously cut vent when the probe 10 reciprocates upwardly out of the bird as shown at the right side of FIG. 7.

Other activities can be accomplished on the bird as desired by the module 30 such as a neck breaking sequence as is further shown by U.S. Pat. No. 4,910,829. The present module shows a partial neck breaker means by way of illustration. After the crop has been removed and the probe 10 has been retracted from the bird, the bird is released from module 30 and continues on its way on its respective shackle to the next operating station.

The modules 30 at the endless station are driven to the rear of the station where spray means is provided to wash the probes 10 and reverse gearing means is provided to assist in hurling from the comb of the probes the previously entwined crop.

In passing it is noted that the probe disclosed in the U.S. Pat. No. 4,910,829 is supplied with orifices and is connected to a vacuum source whereby to assist in the entrainment of the crop from the bird. The present invention by inventively constructing a probe as described results is a probe that does not need the vacuum to accomplish its function. The present probe is constructed to take advantage of the natural elasticity of the crop and neck; and avoids destruction of other parts of the bird. In operation the probe is not rotated until it is actually in the neck area of the bird thereby obviating the remote possibility of its inadvertently grasping anything else still remaining in the cavity of the bird.

Figure 8:
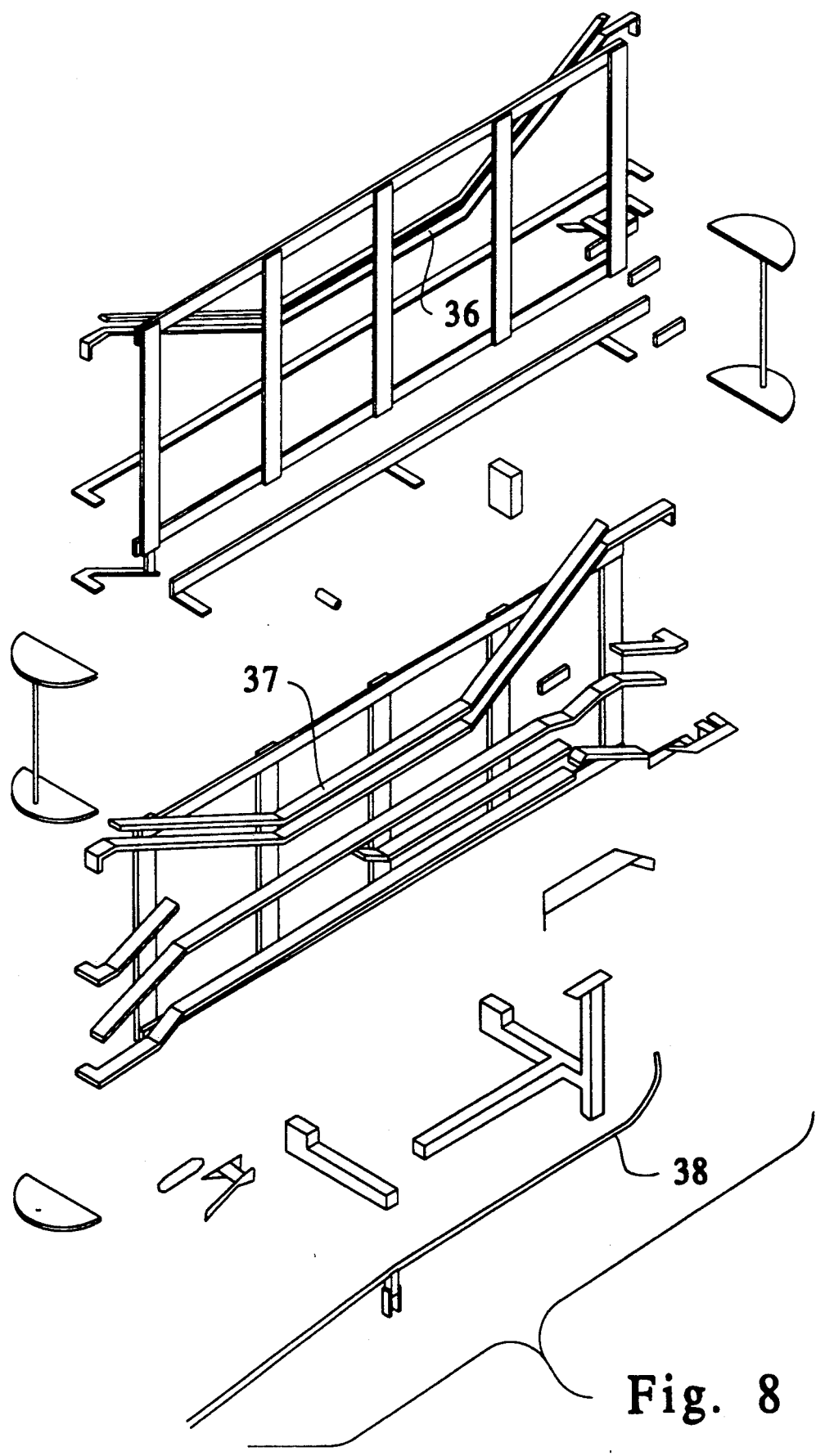
FIG. 8 is part of the support frame for the modules in partial fragmentary form and partly in exploded form showing the cam surfaces for operation of the modules.

The holder 24 is carried on a slide 33 which is slidably mounted in between rails 34. The slide 33 has a cam wheel 35 and rides on cam surface 36 which describes a path from an uppermost portion at the right of the FIG. 8 is a lower position and then back up to an upper position to the left of the the FIG. 8. Cam wheel 35 rides on cam surface 36 so thereby carries the slide 33 upwardly and downwardly and upwardly again.

The module is then free of the bird it moves to the rear of the frame holding means to again move downwardly and upwardly on cam surface 37. During its downward mode the probes are given a vigorous water spray wash by spray means 38 shown in an exploded fashion in FIG. 8.

Both FIGS. 4 and 5 describe the vertical rails 34 for the slide not shown therein. A U-shaped ring 38 is mounted intermediate the top and bottom of the rails. It is designed to assist in preventing the bird from being carried upwardly when the probe is withdrawn from the bird while tugging on the crop. The lower block portion 39 shows a portion of the parts to a neck breaker. The neck breaker is also suitably reciprocated and is moved in this fashion by cam roller 41 which is at the backside of the module.

It should be appreciated that the specific size of the present probe is dictated by the size and type of bird that is to be decroped. Consequently, it is contemplated that the width of the probe may be less than aforestated, but ought to be at least three-quarters of an inch in diameter. It is also contemplated tht the comb portion may have as few as two channels.

It is also contemplated that the probe entrained with the crop could exit out the neck portion of the bird from once it could be removed prior to reciprocating back through the bird and out.

The subject invention should not be limited by the above described and illustrated embodiments, but rather should be limited solely by the claims that follow.

I claim:

1. A probe means for removing the crop of poultry comprising an elongated member, said member having a substantially cylindrical configuration, said member terminating in a rounded bulbous portion at its distal end, said member having a smooth cylindrical portion connecting said bulbous end and a comb portion means, said comb portion means defining a plurality of elongated recessed axially disposed channels, each of said channels being separated from each other by an upstanding radially disposed arcuate wall means, each arcuate wall means terminating in spaced tabs at approximately right angles to said arcuate wall means, said tabs all extending in the same direction across a portion of each of said channels, said comb portion having a diameter substantially similar to said smooth cylindrical portion.

2. The probe means of claim 1 wherein the channels are at least two in number.

3. The probe means of claim 1 wherein the bulbous portion is of plastic.

4. The probe means of claim 1 wherein the diameter of the elongated member is at least three-quarters of an inch.

5. The probe means of claim 2 wherein the channels are six in number.

6. The probe means of claim 4 wherein the diameter of the elongated member is about one and one-eighth inches.

7. A movable module for removing crops when an upside poultry on a shackle on a moving means is brought into back side position against the said module whereupon the crop removing means can operate to remove the said crop from the neck through an end opening of the body of the poultry while the shackle carrying the poultry and the module are moving synchronously comprising a slide means reciprocatingly mounted on rail means on said module, said slide being mounted on a cam means, said cam means detailed to move abutingly against said cam surface mounted on a frame means detailed to movably carry said module, said module having journaling means operatively engaged with a drive means, said probe means being mounted to said slide means and said drive means being operatively engaged to the proximal portion of said probe means to thereby to rotate said probe means, said probe means including an elongated member, said member having a substantially cylindrical configuration, said member terminating in a rounded bulbous portion at its distal end, said member having a smooth cylindrical portion connecting said bulbous end and a comb portion means, said comb portion means defining a plurality of elongated recessed axially disposed channels, each of said channels being separated from each other by an upstanding radially disposed arcuate wall means, each arcuate wall means terminating in spaced tabs at approximately right angles to said arcuate wall means, said tabs all extending in the same direction across a portion of each of said channels, said comb portion means having a diameter substantially similar to said smooth cylindrical portion.

8. The movable module of claim 7 wherein the channels are at least three in number.

9. The movable module of claim 7 wherein the bulbous portion is of plastic.

10. The movable module of claim 7 wherein the diameter of the elongated member is at least three-quarters of an inch.

11. The movable module of claim 8 wherein the channels are six in number.

12. The movable module of claim 10 wherein the diameter of the elongated member is about one and one-eight inches.

* * * * *